(No Model.)
A. S. HALLIDIE.
GOPHER TRAP.
No. 326,864. Patented Sept. 22, 1885.
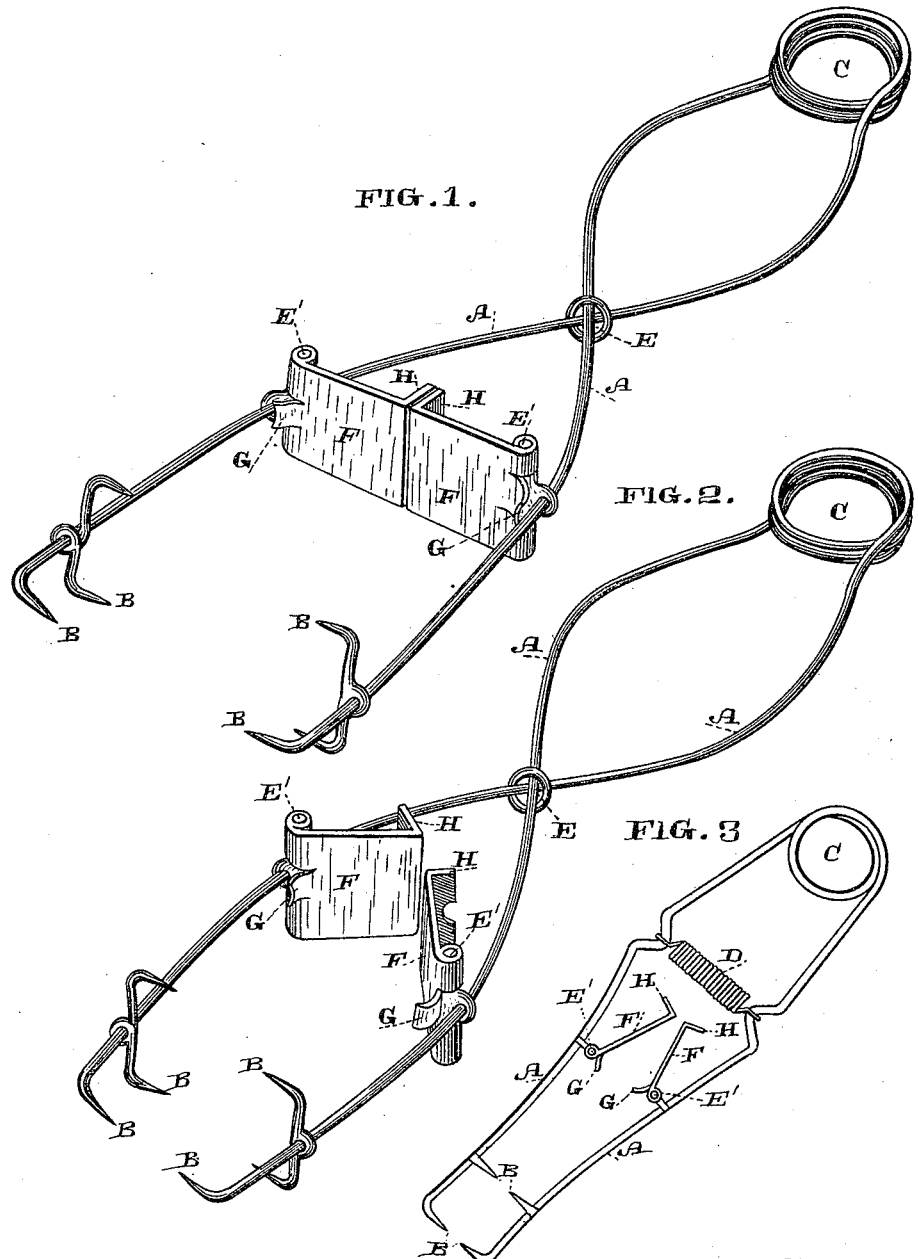

UNITED STATES PATENT OFFICE.

ANDREW S. HALLIDIE, OF SAN FRANCISCO, CALIFORNIA.

GOPHER-TRAP.

SPECIFICATION forming part of Letters Patent No. 326,864, dated September 22, 1885.

Application filed July 6, 1885. (No model.)

*To all whom it may concern:*

Be it known that I, ANDREW S. HALLIDIE, of the city and county of San Francisco, State of California, have invented an Improvement in Gopher-Traps; and I hereby declare the following to be a full, clear, and exact description of the same.

My invention relates to certain improvements in gopher-traps; and it consists of a pair of spring-arms having barbs or points at their outer ends, and a means for setting and holding them apart, which may be operated so as to spring the trap and impale the gopher.

Referring to the accompanying drawings for a more complete explanation of my invention, Figure 1 is a view of my trap set. Fig. 2 is a view of my trap in the act of closing. Fig. 3 is a modification of the construction.

A A are arms or wires, preferably made of spring or elastic metal, having at their outer ends the sharpened points B, which face toward each other. The opposite end or bight of these wires may be formed of one or more coils, C, so as to produce the proper elasticity to close these arms together and cause the points B to interlock.

If desired, an additional spring, as shown at D, Fig. 3, may be employed; but I prefer to construct the device as shown in Fig. 1, where the arms cross each other at E, and the barbed ends may be separated by simply compressing with the hand that portion between the coils C at the rear end and the crossing point E.

Between the teeth B and the point E, I secure to each of the arms a transverse pin, E', and upon each of these pins is hinged a leaf, F, which will turn freely backward around the pin E, but will only swing forward far enough to allow the two to stand in a straight line.

Projecting lugs G form stops by which they may be held. These stops may be bent or adjusted to set the plates so that they will be moved more or less easily in closing the trap. These two leaves or plates meet in the center, and are each bent at the ends, so as to form short extensions H, at right angles with the main portion of the plate. When the arms are closed together, these plates or leaves fold backward between them, as shown in Fig. 2.

When it is desired to set the trap, it is held vertically, with the barbed or toothed end downward, and by compressing the wires together behind the crossing point E the barbed portions will be separated, and the leaves or plates will turn about their hinges, so as to stand in a straight line with each other. When the pressure upon the arms is relieved, the central angular portion of these plates will come together, and pressing against each other will hold the arms apart, the trap being then set. When this trap is to be used, it is introduced into the hole of the gopher, with the barbed points standing one opposite the other and extending into the hole. When the animal comes out, forcing the pile of dirt before him, the pressure of this dirt against the plates forces them backward about their hinges, thus allowing the spring-arms to close, and the barbs or teeth will impale the animal and kill him.

I am aware that it is not new to form a trap of spring metal with teeth at the outer end, the jaws being held open by plates hinged to opposite sides of the trap, one of said plates being adapted to rest against a shoulder formed upon the other plate, and I do not claim such construction.

Having thus described my invention, what I claim as new, and desire to secure by Letters Patent, is—

1. In combination with the arms A, having barbs at the outer ends, and a spring by which they may be closed together forcibly, the plates or leaves having their outer ends hinged to the respective arms, and their inner ends turned at right angles, forming extensions which meet and rest against each other, so as to hold the arms apart, substantially as herein described.

2. The elastic arms having their outer ends barbed or provided with teeth, in combination with plates hinged to the arms opposite each other, and the adjusting and holding lugs G, substantially as herein described.

In witness whereof I have hereunto set my hand.

ANDREW S. HALLIDIE.

Witnesses.
S. H. NOURSE,
H. C. LEE.